(12) United States Patent
Lappalainen

(10) Patent No.: US 6,980,361 B2
(45) Date of Patent: Dec. 27, 2005

(54) PROJECTION SURFACE

(76) Inventor: Seppo Lappalainen, Kellokoskentie 793, FIN-95400 Jokela (FI)

( * ) Notice: Subject to any disclaimer, the term of this patent is extended or adjusted under 35 U.S.C. 154(b) by 0 days.

(21) Appl. No.: 10/450,093

(22) PCT Filed: Dec. 7, 2001

(86) PCT No.: PCT/FI01/01061

§ 371 (c)(1), (2), (4) Date: Jul. 21, 2003

(87) PCT Pub. No.: WO02/48790

PCT Pub. Date: Jun. 20, 2002

(65) Prior Publication Data

US 2004/0066493 A1  Apr. 8, 2004

(30) Foreign Application Priority Data

Dec. 11, 2000 (FI) .................................. 20002716
Apr. 25, 2001 (FI) .................................. 20010860

(51) Int. Cl.[7] .............................................. G03B 21/56
(52) U.S. Cl. ...................................................... 359/443
(58) Field of Search ............................... 359/443, 452, 359/453, 460

(56) References Cited

U.S. PATENT DOCUMENTS

| | | | | |
|---|---|---|---|---|
| 1,998,054 A | * | 4/1935 | McBurney | 359/452 |
| 2,943,964 A | * | 7/1960 | Goldenberg | 359/443 |
| 3,726,583 A | | 4/1973 | Fijisaki et al. | 359/452 |
| 3,881,800 A | * | 5/1975 | Friesem | 359/443 |
| 4,132,462 A | * | 1/1979 | Hottel et al. | 359/443 |
| 5,193,015 A | | 3/1993 | Shanks | 359/443 |
| 5,715,083 A | * | 2/1998 | Takayama | 359/443 |
| 5,864,426 A | | 1/1999 | Songer | 359/452 |
| 6,529,322 B1 | * | 3/2003 | Jones et al. | 359/443 |
| 2004/0100692 A1 | * | 5/2004 | Hou | 359/452 |

FOREIGN PATENT DOCUMENTS

GB  413572 A  7/1934

* cited by examiner

Primary Examiner—Christopher Manoney
(74) Attorney, Agent, or Firm—Birch, Stewart, Kolasch & Birch, LLP

(57) ABSTRACT

A projection surface for the viewing of a projected video image or equivalent has a reflective surface of the projection surface. The reflective surface has color elements of at least three colors, arranged side by side on the projection surface so as to cover the entire reflective surface of the projection surface.

19 Claims, 1 Drawing Sheet

PROJECTION SURFACE

This application is the national phase under 35 U.S.C. § 371 of PCT International Application No. PCT/FI01/01061 which has an International filing date of Dec. 7, 2001, which designated the United States of America.

FIELD OF THE INVENTION

The present invention relates to a projection surface designed for images projected such as by a video projector or equivalent.

DESCRIPTION OF BACKGROUND ART

Prior-art solutions for a similar purpose include textile projection screens with a reflective surface having a white basic color, thus reflecting all colors. In large spaces and for purposes requiring a large angle of view, projection screens with a dull finish, which are good general-purpose screens, are often used. However, their reflectivity is relatively poor for demanding applications, and therefore they are not well suited for use in bright spaces where there is plenty of diffused light. Metal-coated aluminum or silver screens and so-called iridescent screens give a better reflectivity than dull projection screens, but the problem is a much narrower angle of view. A major problem in the case of all the projection screens described above is encountered in the projection of a dark or completely black color onto the light or white surface of the projection screen. Black portions in the image are areas on which no light is projected at all. All video, motion-picture and slide shows generally look fine in conditions of complete darkness, but when any extra light is admitted into the viewing space, dark portions in the projected image assume a lighter appearance. This extra light is generally called diffused light. The larger the amount of diffused light admitted, the whiter do the dark portions appear, and the image seems to loose contrast. Even in a completely dark room, diffused light is produced when the image is projected onto a white surface. Therefore, on a prior-art projection screen, the image has a poor contrast because black portions of the image are the same color with the white screen. In spaces containing diffused light, normal contrast is achieved by increasing the brightness of the image, which again causes strain of spectators' eyes while also producing more diffused light, thus further weakening the contrast.

A solution disclosed in U.S. Pat. No. 5,864,426 aims at improving color distribution in a projected video image by increasing the reflection of the blue light component. This is implemented by providing the screen with blue reflective elements placed at even distances among the white standard reflective elements, thus improving the reflection of blue light and correspondingly reducing the reflection of red and green light. This solution, too, has the drawback that, while producing a bright image with a good color distribution, it cannot produce the black portions of the image correctly. Since most of the reflective elements in this projection screen, too, are white, black portions of the video image mainly look white.

U.S. Pat. No. 5,193,015 also discloses a solution dealing with the problem caused by diffused light. It comprises a reflector element consisting of a number of superposed layers, two of which are designed to reflect red color, two to reflect green color and two to reflect blue color. The reflector element additionally contains other layers. The solution disclosed in this patent is actually not a textile projection screen but a liquid crystal operated reflector element, which is very expensive as compared with a textile projection screen, especially when implemented in a large size. In addition, a reflector element of this type is considerably more susceptible to damage than the projection surface of the present invention, which may be e.g. a textile projection screen or equivalent.

BRIEF SUMMARY OF INVENTION

The object of the present invention is to eliminate the above-mentioned disadvantages and to achieve a projection surface for use in a textile projection screen or equivalent that is better than prior-art solutions and has good brightness and contrast properties and is capable of reflecting dark portions of the image better than prior-art solutions, especially when the viewing space contains diffused light causing a weakening of contrast. Thus, the projection surface of the invention is excellently applicable for use e.g. in large public spaces requiring a wide angle of view and, due to extra light, a good contrast. A further object is to achieve an economical and reliable solution that is as simple, durable and functional as possible for use in place of current easy-to-use projection screens.

The solution of the invention provides the advantage that, by enhancing the dark portions of the image, it makes it possible to produce an image with a contrast multiple times better than in current projected images, an image that has an excellent quality even when the viewing space contains diffused light. Another advantage is that the tonal value of the image can be maintained even in a space with some illumination. Moreover, the image has a good color distribution. An additional advantage is that the projection surface of the invention can be produced at a low cost as the structure of the projection surface is relatively simple.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

In the following, the invention will be described in detail by the aid of an example embodiment with reference to the attached drawing, which is given by way of illustration only, and thus is not limitative of the present invention, and wherein.

DETAILED DESCRIPTION OF THE INVENTION

Figure 1:
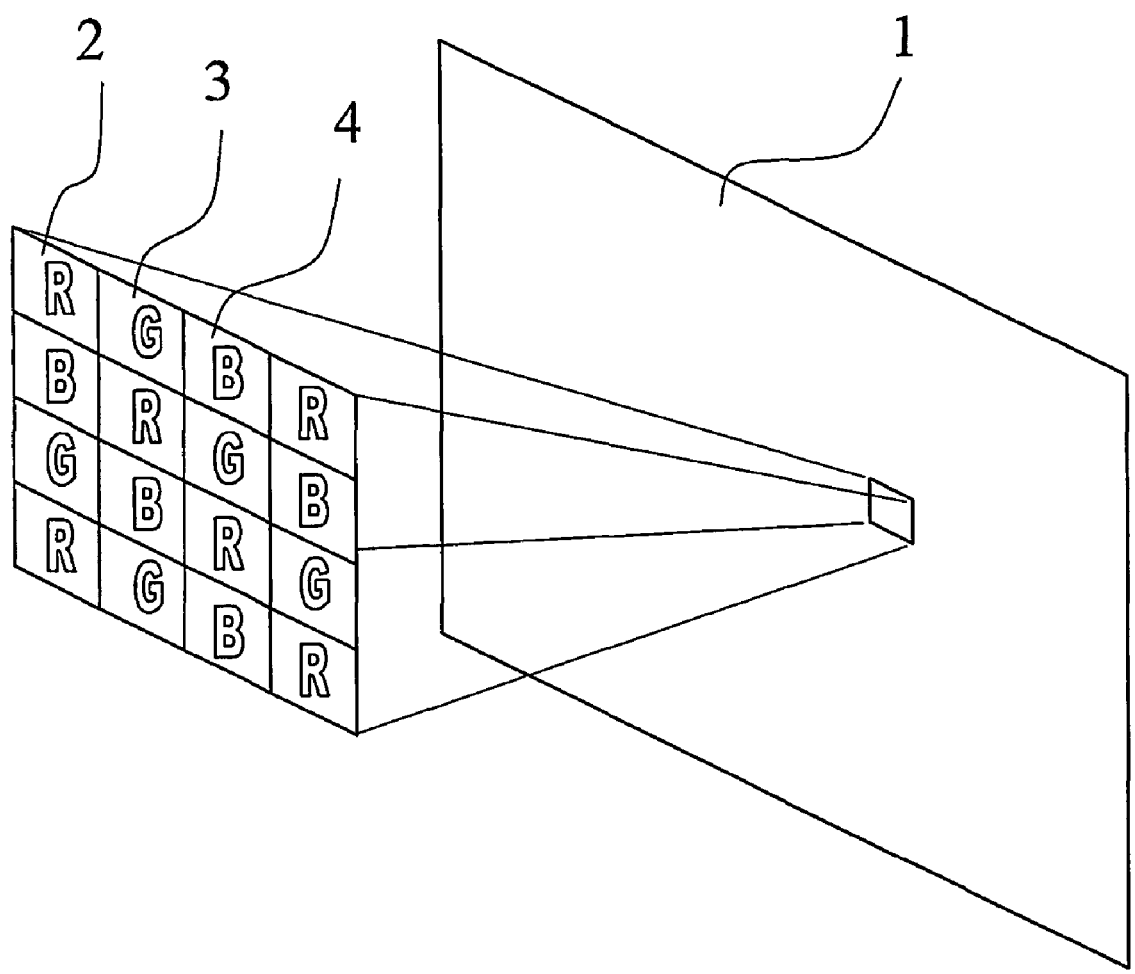
FIG. 1 presents the solution of the invention in an oblique front view.

The projection surface 1 of the invention has a structure that differs from prior-art solutions in that it has no white surface at all, among other things. The projection surface consists of adjacent colored spots serving as color elements, which are all of equal size and spaced at even distances on the surface. Each individual spot is monochromatic. The spots are colored red, green and blue, i.e. with the so-called RGB colors. The spots are so arranged that, on a horizontal row, there is first a red spot 2, and next to this without an interspace a green spot 3, and similarly next to this a blue point 4, likewise without an interspace. After the blue spot there is again a red spot, and so on. The next row below the first one correspondingly starts with a blue spot 4, which is followed by a red spot and a green spot. The next row below that starts with a green spot, correspondingly followed by a blue spot and a red spot. No interspaces are left between rows, either. The entire effective area of the projection surface has been prepared with this arrangement of colored spots, and consequently the surface is not of a light color but appears to be dark gray when seen from a distance.

The colored spots can be created on the projection surface by a known technique. They may be created by spraying in tiny drops, by a printing press technique or by printing on a suitable device, or they may be created by weaving the projection screen from yarns of the required colors. The essential things are even spacing and equal size of all spots as far as possible. The spots need not necessarily be very small, because on a large projection surface and when viewed from a long distance, they combine as a dark gray hue even if they are relatively large. This facilitates the task of producing the projection surface as far as the colored spots are concerned.

The shape of the colored spots may vary depending on the method of manufacture of the projection surface. A good shape is that of a square or rectangle, in which case no gaps are left between separate spots. If the projection surface consists of a woven fabric, then the shape of the colored spots depends on the weaving method and the yarns used.

A video projector generally transmits red, green and blue light rays, which are so applied to the projection surface that a polychrome image is produced, which is reflected from the surface to the spectators. The projection surface of the invention is excellently applicable for use with a video projector because the color elements on the surface are exactly the same colors as those transmitted by the video projector. However, this does not mean that the projection surface cannot be used with a slide projector or film projector or in a presentation of colored or black-and-white transparencies. The projection surface of the invention is just as well suited for these uses, producing a bright image with a good contrast.

It is obvious to the person skilled in the art that the invention is not limited to the example described above, but that it may be varied within the scope of the claims presented below. Thus, the structure of the projection surface may differ from the structure described above e.g. in that the colored spots are arranged in a different way than in the above description. Spots of different color may be placed side by side in the horizontal direction, but in the vertical direction spots of the same color may be placed one above the other. Moreover, the structure may differ in that it does not contain equal quantities of all three colors; instead, depending on the required applicability, the quantity of a given color may be larger or smaller than that of the other two colors. This may be implemented either as a larger or smaller number of colored spots or by using colored spots of a larger or smaller size. A further possibility is that the numbers or sizes of spots of each different color are different. In addition, it is possible to use another, additional color besides the aforesaid three colors.

The solution of the invention concerns a projection surface which may be made of any material suited for use as a surface material. It is conceivable, for example, that the projection surface, either in itself or together with a suitable backing material attached to it, forms an assembly that can be called a projection screen.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. Projection surface for the viewing of a projected image, such as a video image or equivalent, where the surface of the projection surface consists of the combination of color elements of several colors, the colors of the color elements have been chosen to correspond to the colors produced by the projector in use, the color elements consist of differently colored yarns or equivalent, from which the reflective surface of the projection surface has been woven, the projection surface has been woven from yarns which have been twisted of yarns of several colors.

2. A projection surface for viewing of a projected image where a surface of the projected surface includes a combination of color elements of several colors, the colors of the color elements being chosen to enhance dark portions of the projected image and to correspond to colors produced by the projector in use, the projector surface having at least three colors arranged alternately side by side in both horizontal and vertical directions so as to cover the projection surface in a way that the projection surface appears to be dark gray when seen from a distance.

3. The projection surface as defined in claim 2, wherein an entire surface of the projection surface is covered by the at least three colors.

4. The projection surface as defined in claim 2, wherein the at least three colors comprise three colors and are the only colors on the projection surface.

5. The projection surface as defined in claim 2, wherein the color elements are of substantially equal size and are of red, green and blue color and wherein the color elements contact one another.

6. The projection surface as defined in claim 5, wherein the three colors are the only colors on the projection surface.

7. The projection surface as defined in claim 2, wherein the color elements are relatively small in relation to a size of the projection surface and cover an entire surface of the projection surface evenly in both horizontal and vertical directions so that, in the horizontal direction, a red element is always followed by a green element, a green element by a blue element and a blue element again by a red element, and that in the vertical direction, a red element is followed by a blue element, a blue element by a green element and a green element again by a red element.

8. The projection surface as defined in claim 2, wherein the colors are arranged as straight lines and have been placed side by side close to each other.

9. The projection surface as defined in claim 2, wherein the color elements have been created on a reflective surface of the projection surface by one of painting, a printing press technique or printing on a printer.

10. The projection surface as defined in claim 2, wherein the color elements are differently colored yarns from which the projection surface has been woven.

11. The projection surface as defined in claim 10, wherein the projection surface is woven from the yarns which are twisted yarns of several colors.

12. The projection surface as defined in claim 10, wherein only red, green and blue colors are on the projection surface.

13. The projection surface as defined in claim 2, wherein the color elements are in a single plane.

14. The projection surface as defined in claim 13, wherein only three colors are used for the color elements, the color elements cover the entire projection surface.

15. The projection surface as defined in claim 14, wherein the color elements are arranged with at least three sides, each of the sides of the color elements contacting an adjacent side of another color element.

16. The projection surface as defined in claim 15, wherein the color elements have four sides, the color elements being arranged in straight lines in both horizontal and vertical directions on the projection surface.

17. The projection surface as defined in claim 2, wherein the color elements are arranged with at least three sides, each side of the color elements contacting an adjacent side of another color element.

18. The projection surface as defined in claim 17, wherein adjacent color elements contact one another along a complete length of the sides of the color elements.

19. The projection surface as defined in claim 2, wherein the color elements have four sides, the color elements being arranged in lines in both horizontal and vertical directions on the projection surface.

* * * * *